(12) United States Patent
Guionneau (10) Patent No.: US 11,924,211 B2
(45) Date of Patent: Mar. 5, 2024

(54) COMPUTERIZED DEVICE AND METHOD FOR AUTHENTICATING A USER

(71) Applicant: EVIDIAN, Les-Clayes-sous-Bois (FR)

(72) Inventor: Christophe Guionneau, Grenoble (FR)

(73) Assignee: BULL SAS, Les-Clayes-sous-Bois (FR)

( * ) Notice: Subject to any disclaimer, the term of this patent is extended or adjusted under 35 U.S.C. 154(b) by 182 days.

(21) Appl. No.: 17/337,333

(22) Filed: Jun. 2, 2021

(65) Prior Publication Data
US 2021/0385225 A1     Dec. 9, 2021

(30) Foreign Application Priority Data

Jun. 8, 2020 (FR) .................................. 2005977

(51) Int. Cl.
*H04L 9/40*         (2022.01)

(52) U.S. Cl.
CPC ............ *H04L 63/102* (2013.01); *H04L 63/04* (2013.01); *H04L 63/0823* (2013.01); *H04L 63/083* (2013.01)

(58) Field of Classification Search
CPC ... H04L 63/102; H04L 63/04; H04L 63/0823; H04L 63/083
See application file for complete search history.

(56) References Cited

U.S. PATENT DOCUMENTS

| | | | | |
|---|---|---|---|---|
| 8,613,067 B2 * | 12/2013 | Lambiase | ............... | G06F 21/41 726/8 |
| 9,237,021 B2 * | 1/2016 | Mills | ..................... | H04L 9/3268 |
| 10,951,418 B1 * | 3/2021 | Graziano | ............... | H04L 9/3263 |
| 2005/0015594 A1 * | 1/2005 | Ashley | ................ | G06F 21/6218 713/168 |
| 2008/0046715 A1 * | 2/2008 | Balazs | ................ | H04L 63/0815 713/152 |
| 2013/0166322 A1 * | 6/2013 | Woods | .................... | G06Q 40/08 705/3 |
| 2013/0269011 A1 | 10/2013 | Wilson | | |
| 2014/0082715 A1 * | 3/2014 | Grajek | ................ | H04W 12/068 726/8 |

(Continued)

FOREIGN PATENT DOCUMENTS

EP      2020797 B1      2/2009

OTHER PUBLICATIONS

Preliminary Search Report issued in FR2005977, dated Jan. 25, 2021 (9 pages), and English Translation thereof.

*Primary Examiner* — Catherine Thiaw
(74) *Attorney, Agent, or Firm* — ARC IP Law, PC; Joseph J. Mayo (57) ABSTRACT

The invention relates to a device and a method for authenticating a user utilizing an internet access client (10) for accessing remote resources of a computer infrastructure, said access comprising a first authentication (130) of the internet access client (10) and a second authentication (140) of the user of the internet access client (10). The method includes sending (132), to a token security module (21), by the internet access client (10), a client certificate (220), said client certificate (220) being associated with items of identification information of the internet access client (10); and receiving (133), by the internet access client (10), an authentication token (210) generated by the token security module when the client certificate (220) sent has been verified by the token security module.

10 Claims, 4 Drawing Sheets

(56) References Cited

U.S. PATENT DOCUMENTS

| | | |
|---|---|---|
| 2016/0112410 A1 | 4/2016 | Nedeltchev et al. |
| 2018/0060562 A1* | 3/2018 | Waltermann ............ G06F 21/31 |
| 2019/0165950 A1* | 5/2019 | Ibrahim ................ H04L 9/3268 |
| 2020/0137036 A1* | 4/2020 | Woland ................ H04W 12/08 |
| 2020/0137044 A1* | 4/2020 | Shimazawa ......... H04L 63/0823 |
| 2020/0137081 A1* | 4/2020 | Goldstein ........... H04L 63/0823 |
| 2020/0244657 A1* | 7/2020 | Iwase .................... H04L 63/101 |
| 2021/0021602 A1* | 1/2021 | Munn .................. H04L 9/3263 |
| 2021/0329461 A1* | 10/2021 | Bernsen ................ H04W 12/50 |

* cited by examiner

COMPUTERIZED DEVICE AND METHOD FOR AUTHENTICATING A USER

This application claims foreign priority to French Patent Application No. 2005977, filed 8 Jun. 2020, the specification of which is hereby incorporated herein by reference.

BACKGROUND OF THE INVENTION

Field of the Invention

The invention relates to the field of computer security, and more particularly authentication, capable of being utilized in particular for accessing remote computer resources. The invention concerns a method for authenticating a user utilizing an internet access client, said method allowing the user to access remote resources of a computer infrastructure (e.g. a server). The invention also relates to a device configured for authenticating a user for accessing remote resources of a computer infrastructure (e.g. a server).

Description of the Related Art

Protecting access to networked applications or systems is a well-known problem in a wide variety of contexts. In particular, enterprises increasingly utilize business applications that are accessible via any web browser. These applications may be hosted in the cloud as "Software as a Service" applications or on the servers of the enterprise, utilizing the computer infrastructure of the enterprise.

A user wishing to connect to these business applications must generally authenticate before having access to the content. For example, when a user accesses a cloud application, they can do this from within the enterprise network or mobile from home or from any internet access point. Thus, in some cases, provided a user has available a suitable authentication means, this authentication can take place from anywhere and from any computerized device. In this context, it is usual for a computer application to request users to provide a username and password.

However, so as to limit security problems and in order to continue to manage authentications to cloud applications, enterprises provide each employee with a computer that is fully managed by the enterprise by virtue of MDM ("Mobile Device Management"). The computer is thus fully subject to the security rules of the enterprise, software is installed remotely, and communications pass via a VPN ("Virtual Private Network"). The principle of BYOD ("Bring Your Own Device") is not possible. MDMs are items of enterprise network infrastructure equipment the management of which must be entrusted to specialists. MDMs are often costly and their utilization is restrictive for users.

Moreover, in order to improve security and provide more robust authentication mechanisms, various cryptographic techniques have been developed. For example, PKI ("Public Key Infrastructure") techniques are utilized to create, deliver and manage the cryptographic keys utilized for controlling access to an application. For example, methods have been disclosed for access to a network associated with a network access peripheral comprising sending items of identification information of a user associated with the client peripheral by means of a session certificate in order to authenticate to the network access peripheral (U.S. Pat. No. 9,166,969). In this case, the session certificate and the key are associated with the items of user identification information. However, PKI approaches are often perceived as extremely difficult to deploy and utilize, and this idea has become a dissuasive factor for the adoption of this technology.

In addition, when based on certificates, PKI approaches limit BYOD "bring your own device" routes. For example, a user may need to access these certificates from different computerized devices, but a certificate installed on one computer cannot be utilized from other devices without copying the private key onto each device. This prevents the "on-demand anywhere" access desired for some applications. Installing a certificate (and the private key) on a chip card or USB key gives flexibility of access to the certificate store from several computers, but the requirements for an available USB interface and the ability to install peripheral drivers on a given machine can limit this flexibility. Moreover, managing the life cycle of the certificates is a difficult task due to the various combinations of browsers, operating systems, certificate stores and peripheral keys and drivers involved (in particular, if chip cards are involved).

Other, lighter solutions consist of identifying the browser through browser fingerprinting, by collecting technical data from the browser and assigning a unique pseudo-identifier thereto. When this identifier changes, or an item of browsing context information is modified (for example the IP address, IP geolocation, browser fingerprint, etc.) a confirmation request is made to the user to validate this new browser and certify that its utilization is normal and respects the enterprise usage rules. This confirmation can be requested in the form of an authentication request utilizing a special authentication means, a stronger authentication means, or by a notification and a validation on the user's personal phone.

The principles of browser fingerprint capture rely on code execution mechanisms in user authentication pages. This code collects technical data from the browser and produces therefrom a pseudo-unique fingerprint. If necessary, a cookie, encrypted or not, is placed in the browser to store the fingerprinting. The technical data accessible by code contained in the web pages are quite limited, or can be limited by browser plugins allowing them to be anonymized or modified. Fingerprints are therefore not highly robust. In addition, the fingerprinting technique functions very poorly on a mobile phone, there is little or no difference in the fingerprint between two browsers running on a mobile phone of the same make, model and operating system version.

Thus, there is a need for new authentication solutions allowing utilization by an authorized user of a browser on a computer or phone that is not managed by the enterprise, but the security of which is considered sufficiently safe to be utilized.

BRIEF SUMMARY OF THE INVENTION

The purpose of the invention is to overcome the drawbacks of the prior art.

In particular, the purpose of the invention is to propose a method for authenticating a user utilizing an internet access client for accessing remote resources of a computer infrastructure (e.g. a communications server), said method making it possible to ensure the identification of the internet access client independently of authentication of the user, while still being quick and simple to implement. A further purpose of the invention is to propose a computerized device for authenticating a user utilizing an internet access client for accessing remote resources of a computer infrastructure (e.g. a communications server), and configured to allow identification of the internet access client independently of authentication of the user.

To this end, the invention relates to a method for authenticating a user utilizing an internet access client for accessing remote resources of a computer infrastructure, said method comprising:

- a first authentication, of the internet access client, said authentication of the internet access client comprising:
  - sending, by the internet access client, to a computer infrastructure, a client certificate, said client certificate being associated with items of identification information of the internet access client; and
  - receiving, by the internet access client, an authentication token generated by a token security module when the client certificate sent has been verified;
- a second authentication, of the user of the internet access client, said authentication of the user of the internet access client comprising:
  - sending, by the internet access client, to the computer infrastructure, the authentication token, user identification data and user authentication data, said identification and authentication data not being included in the client certificate; and
  - receiving, by the internet access client, a permission for access to the remote resources of the computer infrastructure when the authentication token, the user identification data and the user authentication data have been verified.

The method according to the invention makes it possible to identify the user's browser, by utilizing mechanisms that are more robust than fingerprinting in the browser pages. This principle must also allow the utilization of a browser on a computer or phone that is not managed by the enterprise, but the security of which is considered sufficiently robust to be utilized.

Identification of the browser is under the control of the user, who certifies his browser, or under the control of an administrator who carries out this certification operation directly or indirectly.

Such a solution makes it possible to utilize shared terminals, such as tablets utilized by different salespeople in a business or a bank branch without the need for multiple certificates, while still allowing separate authentication that is more secure. Each user has personal authentication, while the tablet has a single unique identification.

Identification of access clients independently from browsers can become particularly advantageous when valid credentials are stolen or in the event of personation. In fact, within the framework of the present invention, the method can comprise a step of verification of a match between the authentication data of a user and the authentication data of his browser. In the absence of matching, access to the resource can be refused, as this could correspond to a case of unauthorized access to a computerized device with stolen credentials. This double verification makes it possible to limit further the risks of personation and security problems.

According to other optional characteristics of the method, the latter can optionally include one or more of the following characteristics, alone or in combination:

- it also comprises a step of enrolling the internet access client, said enrolment step comprising receiving the client certificate, by the internet access client. This step is preferably dedicated to certifying the internet access client and more broadly the computerized device that will be utilized for accessing the resources by an authorized user.
- if the first authentication of the internet access client is unsuccessful, the method initiates the step of enrolling the internet access client. Thus, a user can certify the internet access client that they intend to utilize for accessing the resources of the communications server, or more broadly of the computer infrastructure.
- it also comprises, before the first authentication of the internet access client, a step of establishing a secure channel between the internet access client and the computer infrastructure (for example the token security module and/or a communications server hosting the resources). Thus, the items of information transit securely, further reducing the risks associated with this access to the remote resources. Alternatively, it is the establishment, by the internet access client, of a remote access session to the resources of the computer infrastructure that comprises the utilization of a secure communication channel with the computer infrastructure.
- if the first authentication of the internet access client is unsuccessful, the user will be offered one or more methods of second authentication, of the user of the internet access client, having a higher security level than that of the authentication method that would have been offered if the first authentication of the internet access client had been carried out successfully. This step allows the enrolment step to be dispensed with.
- if the first authentication of the internet access client is unsuccessful, the user will be refused access to the remote resources of the computer infrastructure. This procedure allows best security for the resources, preventing access to users who may be authorized but are not utilizing a computerized device that has been authorized beforehand.
- the authentication token corresponds to a random code that can be verified only by the computer infrastructure (e.g. the token security module). Alternatively, the authentication token can be verified by a communications server that is not involved either in generating the authentication token or in hosting the resources.
- the authentication token is associated with the IP address of the internet access client and the authentication token can only be utilized once, and only in a message originating from the IP address of the internet access client. This makes it possible to increase by a further level the security associated with a method according to the invention.
- it comprises, after receiving the access permission, establishing, by the internet access client, a remote access session to the resources of the computer infrastructure. This remote access session to the resources may be parameterized so as to be time-limited. It may also be associated with a temporary session certificate.
- the computer infrastructure comprises at least one remote server that does not belong to the same local network as the internet access client. Under these conditions, the first authentication step makes it possible to extend an information system policy beyond the borders of the local network but without the need to manage a strict MDM policy.
- it also comprises a step of verifying the match between the identification data of a user and the identification data of the internet access client utilized by the user, and when these data do not match, the permission for access to the remote resources of the computer infrastructure is not granted. This double verification makes it possible to limit further the risks of personation and security problems.

the user identification data and the user authentication data are entered via a graphical interface coupled with the internet access client.

Other implementations of this invention comprise computer systems, devices and corresponding computer programs stored on one or more computerized storage devices, each being configured to carry out the actions of a method according to the invention. In particular, a system of one or more computers can be configured to carry out particular operations or actions, in particular a method according to the invention, by virtue of installing a software, firmware, hardware or a combination of software, firmware or hardware installed on the system. Moreover, one or more computer programs can be configured to carry out particular operations or actions by virtue of instructions which, when executed by a data processing device, cause the device to carry out the actions.

Thus, the invention also relates to a computer program comprising program code instructions for executing steps of a method according to the invention when said computer program is executed on a computerized device.

The invention also relates to a computerized device configured for authenticating a user for accessing remote resources of a computer infrastructure, said computerized device comprising an internet access client configured to implement the following steps:
 a first authentication, of the internet access client, said authentication of the internet access client comprising:
  sending, to a computer infrastructure, a client certificate, said client certificate being associated with items of identification information of the internet access client;
  receiving an authentication token generated by a token security module when the client certificate sent has been verified;
 a second authentication, of the user of the internet access client, said authentication of the user of the internet access client comprising:
  sending, to the computer infrastructure, the authentication token, user identification data and user authentication data, said identification and authentication data not being included in the client certificate;
  receiving a permission for access to the remote resources of the computer infrastructure when the authentication token, the user identification data and the user authentication data have been verified.

BRIEF DESCRIPTION OF THE DRAWINGS

Other advantages and characteristics of the invention will become apparent on reading the following description given non-limitatively by way of illustration, with reference to the attached figures.

DETAILED DESCRIPTION OF THE INVENTION

Aspects of the present invention are described with reference to flowcharts and/or functional diagrams of methods, apparatus (systems) and computer program products according to embodiments of the invention. In the figures, the flowcharts and functional diagrams illustrate the architecture, the functionality and the operation of possible implementations of systems, methods and computer program products according to various embodiments of the present invention. In this respect, each block in the flowcharts or block diagrams can represent a system, a device, a module or a code, which comprises one or more instructions that can be executed for implementing the specified logical function or functions. In some implementations, the functions associated with the blocks may appear in an order different from that indicated in the figures. For example, two blocks shown successively may in fact be executed substantially simultaneously, or the blocks may sometimes be executed in reverse order, depending on the functionality involved. Each block of the principle diagram and/or flowchart, and of the combinations of blocks in the principle diagram and/or flowchart, can be implemented by special hardware systems that execute the specified functions or acts or carry out combinations of special hardware and computer instructions.

DESCRIPTION OF THE INVENTION

By "internet access client" is meant, within the meaning of the invention, a component of a client-server model from which the user launches an application that will be processed partly in another component of the computer network, the server. A client is generally constituted by application software.

By "server" or "communications server" is meant, within the meaning of the invention, a computerized device chosen to organize the network as a whole. A communications server comprises one or more processors configured to execute instructions stored on a computer-readable media in order to carry out various operations, such as storing and managing items of identification information of the enrolled users, generating and/or managing session certificates for the users. For example, it manages access to the resources and peripherals and the connections of the different users. It can for example be equipped with network management software. There may also be several servers on a network.

By "computer infrastructure" is meant, within the meaning of the invention, an assembly of computer structures (i.e. computerized devices) capable of running an application or an application chain. The computer structure can be a server and can for example be composed of a presentation server, a business server and a data server. The computer infrastructure can also be a test server with the same resources as a production server or also a clone of a virtual production server. Preferably, the computer structure is one or more servers such as for example a web server, an authentication server and an identity server. Moreover, the computer infrastructure can comprise, or be coupled to, a certificate server.

By "resources" is meant data, computing capabilities or other functionalities of computerized devices or more specifically of servers. These resources can be rendered accessible to third party computerized devices, in particular when they have permission thereto. The resources can be defined as remote resources when the computerized device desiring access thereto is not connected to the same local network as the computerized devices hosting said resources.

By the expression "client certificate" is meant, within the meaning of the invention, any electronic document utilized to identify an internet access client. This can make it possible in particular to associate a public key with this internet access client. Thus, the client certificate provides a recognised proof of the identity of the internet access client.

By "processing", "calculating", "determining", "displaying", "extracting", "comparing" or more broadly "executable operation" is meant, within the meaning of the invention, an action carried out by a device or a processor, unless otherwise indicated by the context. In this respect, the operations relate to actions and/or processes of a data processing system, for example a computer system or an electronic computerized device, such as a computer, which handles and converts data represented as physical (electronic) quantities in the memories of the computer system or other devices for the storage, transmission or display of information. These operations can be based on applications or software programs.

By the terms or expressions "application" "software", "program code" and "executable code" is meant any expression, code or notation, of a set of instructions intended to cause data processing in order to carry out a particular function directly or indirectly (e.g. after an operation of conversion to another code). The examples of programme code can include, without limitation thereto, a sub-program, a function, an executable application, a source code, an object code, a library and/or any other sequence of instructions designed for execution on a computer system.

By "processor" is meant, within the meaning of the invention, at least one hardware circuit configured to execute operations according to instructions contained in a code. The hardware circuit can be an integrated circuit. Examples of a processor comprise, without limitation thereto, a central processor unit, a graphics processor, an application-specific integrated circuit (ASIC) and a programmable logic circuit.

By "coupled" is meant, within the meaning of the invention, connected directly or indirectly with one or more intermediate elements. Two elements may be coupled mechanically, electrically or linked by a communication channel.

The expression "human-machine interface" within the meaning of the invention corresponds to any element allowing a human being to communicate with a computer, in particular, and as a non-limitative list, a keyboard and means making it possible in response to the orders input on the keyboard to perform displays and optionally to select elements displayed on the screen utilizing the mouse or a touchpad. Another example embodiment is a touchscreen, making it possible to select elements touched by the finger or an object directly on the screen, optionally with the ability to display a virtual keyboard.

By "module" is meant, within the meaning of the invention, a device, a physical or virtual element capable of forming part of a system and capable of having its own internal mechanisms (drivers and peripherals, etc.) capabilities and functionalities. A module within the meaning of the invention can correspond to an extension, a card, a code, a driver, a program, software, a disk, a file, an extension, an item of computer equipment, a component or peripheral, etc.

In the remainder of the description, the same references are utilized to denote the same elements. Moreover, the different characteristics presented and/or claimed can advantageously be combined. The presence thereof in the description or in the different dependent claims does not exclude this possibility.

For user authentication prior to access to business applications available in the cloud, the administrators of computer infrastructure have the choice between secure solutions which are nevertheless heavy and costly to implement such as management by the enterprise by virtue of MDM ("Mobile Device Management") and PKI approaches on the one hand, or alternatively lighter but less trusted solutions on the other hand.

In order to overcome this, the inventor has implemented a technical solution based on a strong identification of an internet access client (e.g. a browser) of the computerized device utilized by the user, by utilizing mechanisms that are more robust than fingerprinting in the browser pages.

In particular, the technical solution relies on authenticating a browser on a computerized device independently of authentication of the user. This advantageously makes it possible to utilize shared terminals, such as tablets utilized by different salespeople in a business or a bank branch. Each user has personal authentication, while the tablet has a single unique identification.

Thus, within the framework of the invention, and as will be detailed hereinafter, when a user attempts to authenticate to a remote server from a computerized device utilizing an internet access client, even before authentication of the user is carried out, a verification of the internet access client is performed. For example, this makes it possible to ensure that the browsers and more broadly the computerized devices that are utilized by users are computerized devices (portable, fixed or mobile phones) belonging to the enterprise, or having security means validated by the enterprise. For example, an employee of an enterprise can be authorized to access a cloud application from their work computer from home, and from a certified phone but not from their personal computer that has no antivirus or other up-to-date protection systems and thus is not certified.

Thus according to a first aspect, the invention relates to a method 1 for authenticating a user utilizing an internet access client 10 for accessing remote resources of a computer infrastructure (e.g. a communications server 20). The method can be executed by a computerized device 11. The invention can be implemented on any computerized device 11 configured to be able to access applications such as a web application, a content-sharing platform or a computing platform.

The invention will be described in the context of a portable computerized device and more particularly a tablet capable of accessing remote resources of a communications server 20. However, the invention is not limited to this context and can find other applications in other contexts or even fields. Moreover, as will be described hereinafter, the internet access client 10 is configured to interact with a computer infrastructure comprising for example a communications server 20 comprising resources which a user of the internet access client wishes to access, a token security module 21, an authentication server 30, and/or a certificate server 40.

Figure 1:
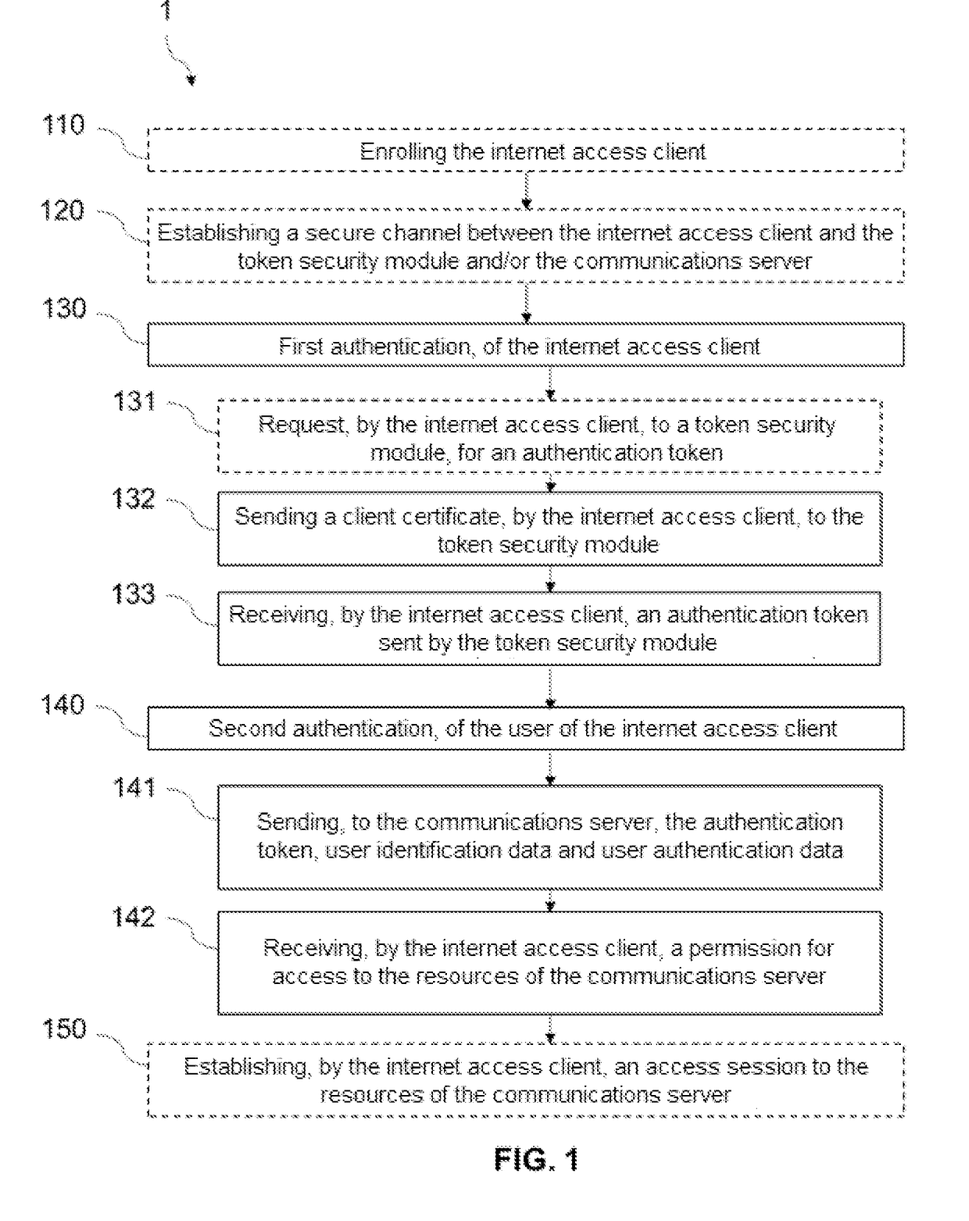
FIG. 1 shows an embodiment of a method for authenticating a user according to the invention. The steps enclosed by dotted lines are optional.

As shown in FIG. 1, the method according to the invention comprises an authentication 130 of the internet access client 10, then an authentication 140 of the user of the internet access client 10.

Authentication of the internet access client is necessary and distinct from identification of the user of the internet access client. Thus, the method allows trusted identification of an internet access client on the one hand and trusted identification of a user of this internet access client on the other hand.

Moreover, as shown in FIG. 1, the method according to the invention can also comprise:
a step of enrolling 110 the internet access client 10,
a step of establishing a secure channel 120,
a step of establishing 150 an access session to the resources of the computer infrastructure.

Thus, the method for authenticating a user according to the invention can begin with a step of enrolling 110 the internet access client 10. This enrolment step 110 allows and generally comprises receiving the client certificate 220, by the internet access client 10.

This enrolment step 110 can be triggered automatically when a user attempts to authenticate to the computer infrastructure from an internet access client 10 that does not have a valid client certificate. The internet access client 10 can attempt to authenticate to the computer infrastructure (e.g. to a communications server 20 or to an authentication server 30).

Alternatively, this enrolment step 110 can be triggered dynamically, by a user or by an administrator.

Figure 2:
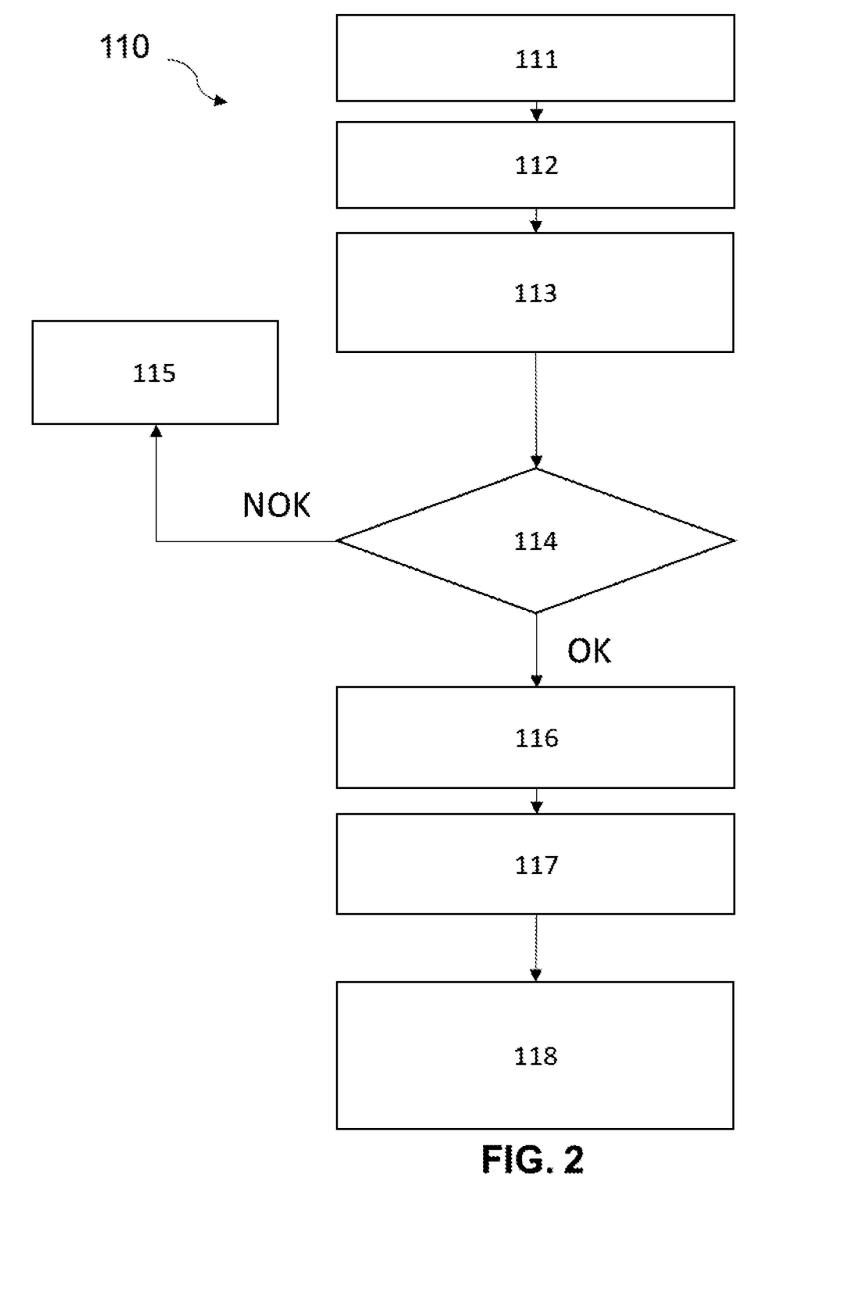
FIG. 2 shows an embodiment of an enrolment step of a method for authenticating a user according to the invention.

An enrolment step 110 is for example detailed in FIG. 2.

As mentioned, the internet access client 10 of a user is redirected to the enrolment phase when there is an attempted authentication, or intentionally when intentionally triggered 111 by a user or an administrator. The enrolment phase comprises establishing a communication 112 with the computer infrastructure and more particularly an authentication server 30. Activation, for example, the production and distribution, of the client certificate of the session can take place over a secure channel within the framework of the network authentication. This network authentication is utilized to verify that the user of the computerized device 11 is permitted to access the network and more particularly the authentication server.

During the enrolment step 110, the user must authenticate 113 with a strong authentication mechanism (i.e. respecting predetermined security rules with for example two-factor authentication). The enrolment request can thus trigger a process of sending authentication and validation data 114 with confirmation by email, phone, SMS, third party security application or also a manual verification by an administrator.

During this enrolment step 110, the user or the administrator certifies that the computerized device on which the client certificate 220 will be installed is a trusted computerized device. In an embodiment, the user will have an administrator user profile, and certification will be implicit. In another embodiment, the user is a user already known to the system and has the right to enroll a client certificate; the user certifies the validity of their enrolment request.

If the data are not validated (NOK), an error message can be sent 115 to the internet access client 10. When the enrolment is confirmed and validated, the certificate server 40 generates 116 a key pair and a client certificate to be sent to the computerized device 11. The certificate server 40 may store the certification information for subsequent traceability. For example the client certificate 220 can be an X.509 certificate.

The authentication server 30 can store 117 the client certificate fingerprint in order to be able subsequently to validate it more quickly, and to be able to complete the items of stored certification information for traceability.

The client certificate 220 can be accompanied by a private key, and by a certification authority of the certificate. The client certificate 220 can also be protected by a password, which can be transmitted by a parallel channel (email, SMS, phone, email to another correspondent such as an administrator, etc.) or when downloading. This password is then necessary to carry out the installation of the client certificate. For example, a client certificate 220 can be utilized by an internet access client 10 on the basis of items of identification information of the internet access client that were stored with the certificate server 40 at a given time.

Generally, the computerized device 11 obtains the client certificate 220 directly from the certificate server 40. A link is for example transmitted to the internet access client 10. This can be done either during browsing, or via an email. A link may point to the client certificate 220 to be downloaded; said download possibly requiring a fresh user authentication.

The client certificate 220 can be installed 118 by utilizing the technical procedure specific to each type of internet access client 10. The client certificate 220 is a file in a format compatible with the formats supported by the internet access client 10. Preferably, the user stores the client certificate 220 in the certificate stores of the internet access client 10. The internet access client 10 can then be identified and authenticated.

In this context, a client certificate 220 is advantageously a digital certificate delivered to an internet access client 10 and capable of then being utilized by a plurality of users. Advantageously, the private key of the certificate is kept by the internet access client 10. This makes it possible to limit its dissemination and ensure that the internet access client utilized is in fact the one that has been approved.

The client certificate 220 is bound to the identity of the internet access client 10 and is generated by the certificate server 40 based on a request by the internet access client 10 preferably transiting through an authentication server 30 or a token security module 21. Advantageously, a public/private key pair unique to the internet access client is generated by the certificate server 40 and associated with the client certificate 220.

Once the client certificate 220 has been generated, the certificate server 40 sends the client certificate 220 and the key pair to the token security module 21 or directly to the computerized device 11 on which the internet access client 10 executes.

The internet access client 10 stores the client certificate 220 and at least one key in the local memory of the computerized device 11. Alternatively, the computerized device 11 stores the client certificate 220 and at least one key in the local memory, then after having received a request from the internet access client, the computerized device 11 renders the client certificate 220 and one or more keys available for the internet access client 10 by means of an API ("Application Programming Interface").

The internet access client 10 can utilize the client certificate 220 and the public key for authenticating to various entities of a network. Consequently, the client certificate 220 can be utilized as proof of the fact that the internet access client has been considered to be a secure means of access to the resources of a computer infrastructure (e.g. the communications server 20).

In particular, the client certificate 220 is valid for a predetermined duration, which is indicated in the client certificate 220. This predetermined duration is also known as the certificate expiry time, or the certificate validity period, or simply as the validity period.

The method for authenticating a user according to the invention can also comprise, before the first authentication 130, a step of establishing a secure channel 120 between the internet access client 10 and the computer infrastructure. In particular, this secure channel can be established with the token security module 21, the authentication server 30 and/or the communications server 20.

As in the methods of the prior art, there may be an authentication server which relates to the trusted identification of a communications server by the internet access client 10.

This step of establishing a secure channel 120 is generally done before sending items of identification and authentication information from the internet access client and from the user.

The method for authenticating a user according to the invention comprises an authentication 130 of the internet access client 10. This authentication 130 of the internet access client 10 is also called first authentication, as advantageously it takes place in time before an authentication of the user of the internet access client 10.

This authentication 130 of the internet access client 10 can comprise a request 131, by the internet access client 10, for an authentication token 210.

The request 131 for an authentication token 210 can in particular be made by the internet access client 10, to a token security module 21. This token security module 21 can be hosted by the communications server 20 holding resources to which a user wishes to gain access, or also by an authentication server 30.

The authentication token can correspond to a random code that can be verified only by the token security module 21.

This authentication 130 of the internet access client 10 can comprise sending 132, a client certificate 220, to an authentication server. As has been described, the client certificate 220 is advantageously associated with items of identification information of the internet access client 10. The items of identification information of the internet access client 10 may for example correspond to the name of the internet access client, a version number, parameterization values.

In an embodiment, sending 132 a client certificate 220 is carried out by the internet access client 10, and is directed to an authentication server or more particularly to a token security module 21. This sending can be direct or indirect. Thus, within the framework of sending the client certificate 220, the latter may transit via the communications server 20 hosting the resources to which the user of the internet access client wishes to gain access.

In particular, the internet access client 10 can also send data relating to its characteristics. These data relating to its characteristics may for example correspond to the name of the internet access client, a version number, parameterization values. The internet access client 10 may also send randomly generated data.

The internet access client 10 may then digitally sign these data (i.e. data relating to its characteristics and/or randomly generated data) and send these signed data and the client certificate 220 at the same time to the computer infrastructure and in particular to the authentication server 30 or to the token security module 21.

The computer infrastructure and in particular the token security module 21 may then utilize public key cryptography techniques to validate the signature and confirm the validity of the certificate.

Moreover, the computer infrastructure may carry out a verification of the characteristics of the internet access client.

In comparison with the methods proposed by the prior art, here, the computer infrastructure (e.g. the communications server 20 or the token security module 21) do not utilize prior authorization by the client certificate 220 for authenticating the user. The computer infrastructure uses prior authentication by client certificate 220 only for authenticating the internet access client 10 that has the client certificate 220. In particular, the computer infrastructure (e.g. the communications server 20 or the token security module 21) verifies the prior authorization by client certificate, utilizing the submitted data of the client certificate by comparing them with the data of the distributed and known certificates from its database.

The computer infrastructure can accept or reject authentication by the client certificate as a function of the verification of the client certificate and of the data from the database. In the absence of this first authentication of the internet access client 10 there can be no authentication of the user. In particular, if the first authentication of the internet access client 10 is unsuccessful, the method can initiate the enrolment step 110.

The computer infrastructure can modify its authentication strategy and the authentication methods assigned to the user as a function of the prior authentication by client certificate.

When the client certificate 220 sent has been verified by the token security module, the determination of the digital certificate is validated. Determining the validity of the digital signature also comprises validating the digital certificate. In particular, it comprises determining that the digital signature has been generated utilizing the private key corresponding to the public key indexed in the client certificate.

Authentication by client certificate 220 is not sufficient to authenticate the user but it is a prior requirement to authentication of the user.

The first authentication 130 can then comprise receiving 133, by the internet access client 10, an authentication token 210 generated by the token security module. Preferably, when the client certificate 220 has been verified by the token security module.

It should be noted that this first authentication step is independent of the user. Thus, different users can utilize the same software having the same client certificate to authenticate with authentication methods that can be different or the same for each user.

Conversely, client certificates as they are proposed today are associated with particular users and are not subject to verification prior to authenticating a user.

Figure 3:
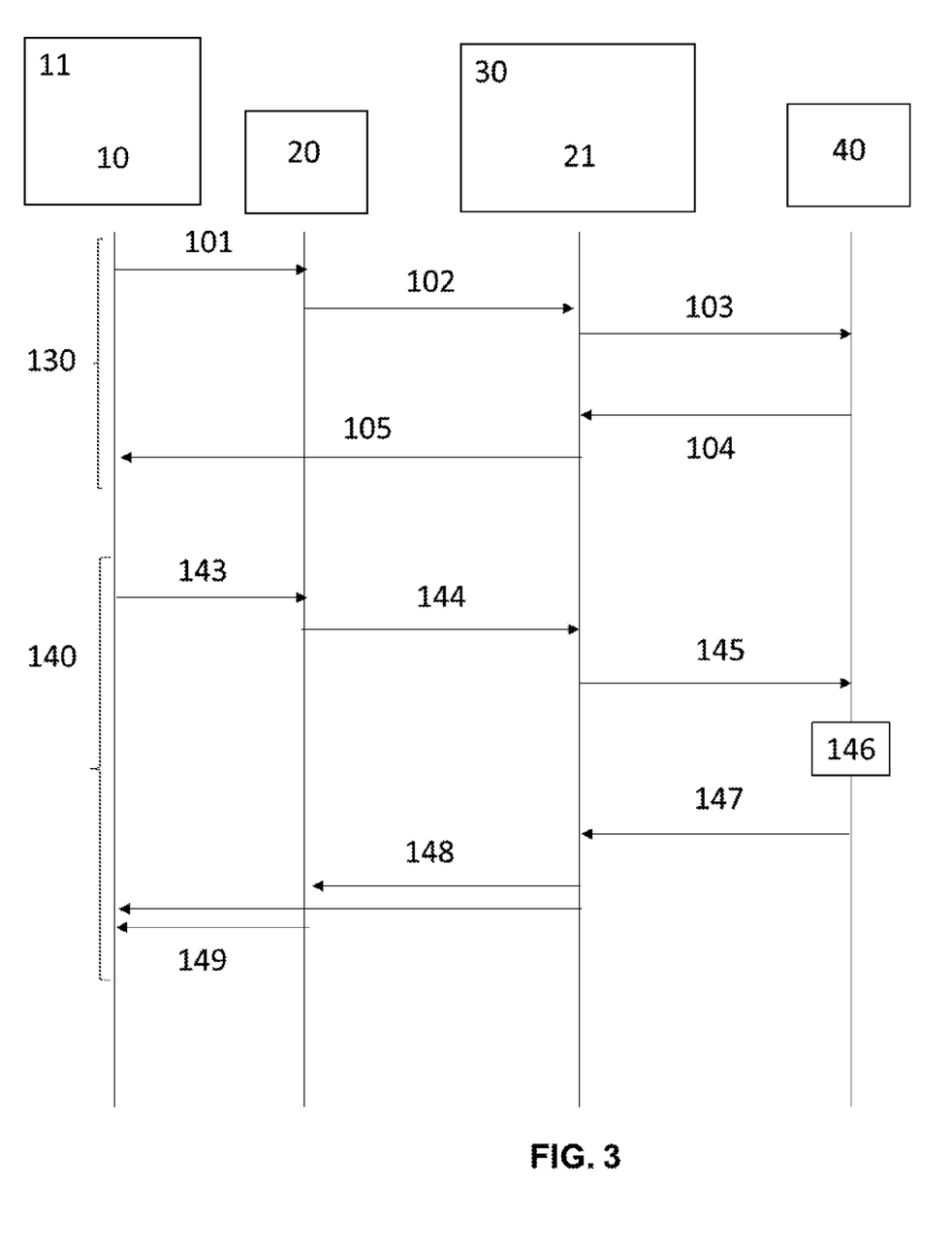
FIG. 3 shows an embodiment of a method for authenticating a user according to the invention.

FIG. 3 shows an embodiment of the present invention.

Within the framework of the present invention, an internet access client 10 installed on a computerized device 11, such as for example a tablet 11, can be utilized by a user to attempt to access 101 an HTML authentication page of a computer infrastructure (web server, authentication server, SAML/OpenIDConnect/etc. identity server).

The HTML authentication page in question can advantageously comprise a script configured to execute in the background and attempt to obtain a URL ("Uniform Resource Locator"). The URL in question is protected by a certificate authentication. Any attempt to access this URL will trigger a request 102 for certificate negotiation according to the SSL/HTTPS protocol.

A token security module 21 can then be configured to verify the client certificate 220 (e.g. validity date, revocation list, fingerprint, certification authority, serial number, etc.) without utilizing the content of the client certificate 220 to identify and authenticate a user. This verification can be entrusted to a token security module 21 hosted or not on the communications server 20 comprising the resources of interest. For example, the token security module 21 can be hosted on an authentication server 30.

As shown in FIG. 3, the token security module 21 can send 103 verification data to the certificate server 40 then receive 104 a rejection or a validation from the certificate server 40. In fact, le token security module 21 can determine from the client certificate 220 that the certificate server 40 is the certification authority that generated the client certificate 220. The token security module 21 can thus communicate with the certificate server 40, for example, on the network, to verify the client certificate 220. For example, the client certificate 220 can be a certificate established according to the X.509 standard, and the token security module 21 requests 103 the certificate server 40 utilizing messages according to the OCSP "Online Certificate Status Protocol" to validate the certificate server 220. This OCSP request message makes it possible to determine the revocation status, namely the validity, of the client certificate 220. The OCSP request message can include the client session certificate within the framework of the message.

The certificate server 40 looks up the validity of the client certificate 220 in its database and sends 104 a response message to the token security module 21 with items of information on whether the session certificate is valid or invalid, for example, if the client certificate 220 has expired or is revoked.

If the client certificate 220 is valid, the token security module 21 sends 105 an acceptance message to the tablet 11 indicating that it accepts the client certificate 220 as verified proof of the identity of the client device 10. This can be considered to be the end of the first authentication phase 130.

When the validity of the client certificate 220 is confirmed, an authentication token tok0 is transmitted from the token security module 21 to the internet access client 10. This authentication token can for example adopt the form of a unique code Tok0 calculated by the communications server or the token security module. This unique code Tok0 can then be saved for example by the communications server or the token security module for a future verification.

However, if the response message from the certificate server 40 informs that the client certificate 220 is invalid, the communications server 20 or the token security module 21 rejects the client certificate 220 and sends a message to the tablet 11 to inform the internet access client 10 of this. Moreover, the message can include a request to provide additional items of verification information for the internet access client 10.

Moreover, the method according to the invention is such that if the first authentication is unsuccessful, the user will be offered one or more methods of second authentication that are stronger than the second authentication method that would have been offered if the first authentication had been carried out successfully.

Alternatively, according to the configuration of the method, if the first authentication 130 is unsuccessful, the user may be refused access to the remote resources of the server 20.

Thus, a stronger authentication method, optionally a stricter one, may be offered to the user by redirecting the tablet 11 to an authentication method assigned by the computer infrastructure. This authentication method is reserved to users utilizing unidentified web browsers.

Before the computer infrastructure (e.g. the server 20) allows the internet access client 10 to access its resources (e.g. its content), a step 140 of authentication of the user of the internet access client 10 must be conducted.

Preferably, the second authentication comprises sending 141, by the internet access client 10, the authentication token 210, user identification data and user authentication data.

As will be described hereinafter, the authentication token 210, the user identification data and the user authentication data are sent to the computer infrastructure. This sending 141 is preferably directed to the communications server 20.

Alternatively, this sending can be directed to another server dedicated to authentication, for example to the authentication server 30.

Moreover, advantageously the user identification and authentication data are not included in the client certificate 220. Even though the user identification and authentication data may be comprised in the certificate, this second step comprises the utilization of an authentication token 210 proving that the internet access client 10 utilized has been independently approved.

Preferably, the second authentication also comprises receiving 142, by the internet access client 10, a permission for access to the remote resources of the communications server 20. This permission is granted in particular when the authentication token 210, the user identification data and the user authentication data have been verified, preferably by the computer infrastructure (e.g. the communications server 20, another server dedicated to authentication or also the token security module 21).

In particular, it may be considered that the user is successfully authenticated if the authentication method chosen or imposed on the user is carried out successfully and if the random code transmitted during this authentication is successfully verified by the authentication server.

As shown in FIG. 3, in particular, the second step of authentication 140 can comprise displaying 143 an authentication page in the internet access client 10, said authentication page being capable of comprising the unique code Tok0. The user can then input, in the HTML, authentication page, their username and password or any other items of user authentication information. The authentication page then sends 144 the items of user authentication information together with the code Tok0 to the token security module, the communications server 20 or also to an authentication server 30.

The addressee receives the items of user identification information and verifies them. The unique code Tok0 is verified 145 and the authentication is validated if the code Tok0 is recognised on the one hand, and if the items of user authentication information are recognised 146 on the other hand. The verification can in particular comprise a verification and a validation 147 by the certificate server 40. In an embodiment, the code Tok0 can only be utilized once, from the same IP address as for the internet access client 10.

The token security module 21 or the authentication server 30 sends 148, 149 a message to the computerized device 10 and/or to the communications server 20 granting access permission.

This user authentication method 140 is preferably independent of the authentication of the internet access client carried out by client certificate. That is to say that, preferably, authentication of the user. is carried out by means of information not originating from the client certificate.

The authentication may for example rely on utilizing a username and password. For example, the communications server 20 or another server may request a user to provide a name and a password before granting access rights to certain parts of the communications server 20. The communications server 20 holds directly or indirectly a list of the usernames and passwords; if a particular username is in this list, and the user provides the correct password, the server grants access rights.

The user identification data and the user authentication data are entered via a graphical interface coupled with the internet access client 10.

The authentication may also be based on a code sent by SMS or by means of a dedicated application, by PKI contained on a chip card, a USB key or via another certificate dedicated to the user.

Generally, and as mentioned above, the internet access client 10 sends the user authentication data over the network, in the clear, or preferably by an encrypted SSL connection.

For example, the method comprises, after receiving the access permission, establishing 150 a remote access session to the resources of the communications server 20. Preferably, this establishment is implemented by the internet access client.

Thus, the step of establishing 150 a remote access session to the resources of the communications server can comprise the utilization of a secure communication channel with the communications server. This secure communication then allows the internet access client to access one or more remote resources of the communications server 20. Access to the remote resources is thus done in a trusted and secure manner, while still being managed.

Moreover, particularly advantageously, the communications server 20 can be a remote communications server that does not belong to the same local network as the internet access client 10. Thus, access to a communications server 20 by a user can be carried out from anywhere. The security of the communications server then being ensured by means of the first authentication of the internet access client, and by the second authentication of the user of the internet access client.

Thus, the step of establishing 150 a remote access session to the resources of the computer infrastructure can be carried out by utilizing a secure communication channel between the internet access client and a remote computer infrastructure.

As described, the embodiments presented here provide techniques for authenticating a user requesting access to a cloud-based or a hosted application. Within the framework of the authentication process, an application of the internet access client type is subjected to an authentication challenge based on a certificate and keys allocated beforehand. It is only after a validated authentication of the application that a user may, by means of the authenticated application, connect by virtue of a second authentication, to the remote resources of the computer infrastructure. Advantageously, this approach does not require a computerized device to have a correct set of peripheral drivers for a hardware token, or to install a copy of a private key for each user by means of this device for accessing remote resources. Consequently, the embodiments provide an authentication process that makes it possible for users to gain secure access to hosted applications in the event that users are not utilizing an item of enterprise hardware exclusively dedicated to them.

Although the foregoing relates to embodiments of the present invention, other embodiments of the invention can be envisaged without departing from its basic scope, the scope thereof being determined by the claims hereinafter.

As a person skilled in the art will understand, aspects of the present invention can be produced as device, system, method or computer program product (i.e. software program). Consequently, aspects of the present invention can adopt the form of an embodiment entirely in hardware, an embodiment entirely in software (comprising firmware, resident software, microcode, etc.) or a particular embodiment such as a "circuit", "module" or "system". Moreover, aspects of the present invention can adopt the form of a computer program product incorporated in one or more computer-readable media having a computer-readable program code incorporated therein.

In particular, the steps of the authentication method according to the invention described above can adopt the form of a computer program.

Thus, according to another aspect, the invention relates to a software program (e.g. a computer program) comprising program code instructions for executing steps of a method according to the invention when said computer program is executed on a computerized device such as a computer. A computer program code for carrying out operations for aspects of the present invention can be written in any combination of one or more programming languages, including an object-oriented programming language such as Java, C++ or similar, the programming language "C" or similar programming languages, a script language such as Perl, or similar languages, and/or functional languages such as Meta Language. The program code can execute entirely on a user's computer, partly on a user's computer and partly on a remote computer or entirely on the remote computer or server. In the latter scenario, the remote computer can be connected to a user's computer by any type of network, including a local area network (LAN) or a wide area network (WAN).

These computer program instructions can be stored on a computer-readable media capable of directing a computerized device (e.g. computer, server, etc.) so that the instructions stored on the computer-readable media produce a computerized device configured to implement the invention.

Similarly, the invention relates to a computer media on which is stored a computer program according to the invention. Any combination of one or more computer-readable media can be utilized. In the context of this document, a computer-readable media can be any tangible media that can contain, or store, a program to be utilized by or in relation with a system for the execution of instructions, appliance or device. A computer-readable media can be, for example, non-limitatively, a system, appliance or device that is electronic, magnetic, optical, electromagnetic, infrared or semi-conductive, or any suitable combination of the aforementioned. More specific examples (a non-limitative list) of the computer-readable storage media would comprise: a hard disk, a random-access memory (RAM).

According to another aspect, the invention relates to a computerized device configured for authenticating a user for accessing remote resources of a computer infrastructure.

Figure 4:
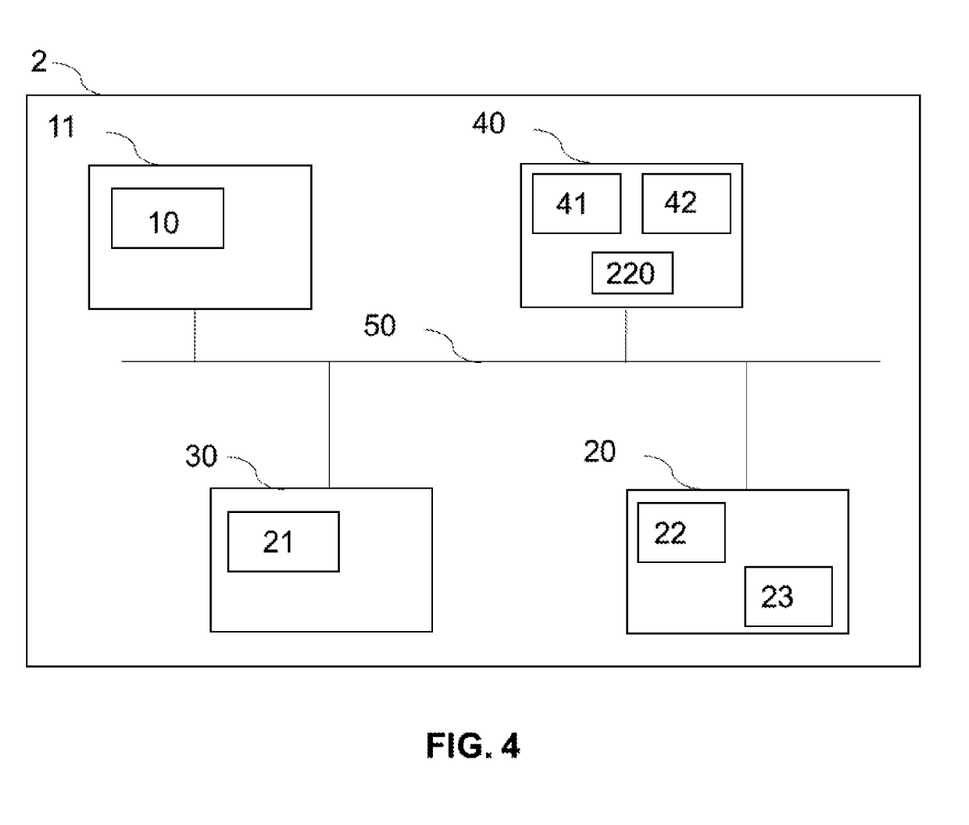
FIG. 4 shows an embodiment of a system on which a method for authenticating a user according to the invention can be implemented.

The computerized device 11 can be a tablet, a portable computer, an office computer, a smartphone, an electronic book reader, a music player or any other suitable computerized device, portable or stationary. The computerized device 11 can comprise one or more processors configured to execute instructions stored by a computer-readable media for carrying out various client operations, such as inputs/outputs, communication, data processing, etc. The computerized device 11 comprises one or more network interfaces through which it can establish wireless or wired connections to one or more networks, such as the internet. The computerized device also executes applications, for example, an internet access client 10 such as a web browser, by means of which the computerized device 11 can establish network sessions with various communications servers 20.

The computerized device 11 according to the invention comprises in particular an internet access client 10 configured to implement one or more steps of the method according to the invention.

An internet access client 10 will be in particular an application configured for access to the internet or more broadly to a communication network. The internet access client may in particular be configured to send requests to one or more communications servers and to receive responses. The internet access client 10 may also have an interface for communication with a user, preferably a human-machine interface which will be graphical. An internet access client may for example be a web browser, a client dedicated to contact with one or more specific communications servers.

An internet access client 10 may be coded in different computer languages. It will be in particular configured, in particular by means of this computer code, to implement a first authentication 130 of the internet access client 10 and a second authentication 140 of the user of the internet access client.

The first authentication may comprise the different embodiments described above and may in particular comprise: sending 132 to the token security module 21 a client certificate 220, said client certificate 220 being associated with items of identification information of the internet access client 10; and receiving 133, by the internet access client 10, an authentication token 210 generated by the token security module when the client certificate 220 sent has been verified.

The second authentication 140 of the user of the internet access client 10 may comprise the different embodiments described above and may in particular comprise: sending 141, to the communications server 20, the authentication token 210, user identification data and user authentication data, said identification and authentication data not being included in the client certificate 220; and receiving 142 a permission for access to the remote resources of the communications server 20 when the authentication token 210, the user identification data and the user authentication data have been verified.

The invention also relates to an authentication system 2 comprising a computerized device 11 for authentication according to the invention and a computer infrastructure (e.g. communications server 20) hosting resources 22 to which a user of the computerized device 11 wishes to gain access. As has been described, the authentication system 2 can also comprise an authentication server 30 and/or a certificate server 40. Moreover, the system may advantageously comprise a token security module 21.

The token security module 21 may for example be hosted by the communications server 20 hosting the resources of interest or by an authentication server 30.

To this end, it may directly or indirectly (e.g. entrusting the verification to the authentication server) verify the items of user identification information received from the computerized device 11.

A communications server is a server that is configured to host a website accessible by client devices via a network. Although a single communications server 20 is shown in FIG. 4, the system can comprise a plurality of web servers that are accessible by client devices over a network. A client device, such as a computerized device 11 according to the invention, can access resources hosted by the communications server 20 by establishing an HTTP connection over the network. In some implementations, the communications server 20 only allows secure connections 50 of client peripherals for access to the resources hosted by the communications server 20. In this case, a computerized device 11 may access the resources hosted by the communications server 20 by establishing a secure connection utilizing, for example, a TLS ("Transport Layer Security") or SSL ("Secure Socket Layer") security protocol.

The communications server 20 can be implemented on one or more servers 23 that collectively execute the functions of authentication, access permission and hosting of the resources within the framework of the present invention. Thus, one and the same computer infrastructure can support the communications servers that host the data of interest and those handling the authentication or also the certificate distribution.

The certificate server 40 can advantageously be configured to generate client certificates 220. For example, it can have authentication methods dedicated to certificate enrolment, including means of user identification and verification by direct means such as verification of username and password, sending a code by SMS, sending a code by email, or verification of the identity of the user by employing a trusted third party such as a colleague or person known to the user or any other means.

Moreover, it can have a database 41, containing items of certificate information and means for verifying the distributed certificates and associating them with the internet access client 10.

Preferably, the certificate server 40 can have a log 42 containing the identities of the users and the client software enrolment operations carried out by the users.

It can also have a database of the users having elevated privileges and authorized to enroll certificates.

What is claimed is:

1. A method for authenticating a user utilizing an internet access client for accessing remote resources of a computer infrastructure, said method comprising:

enrolling the internet access client, said enrolling comprising receiving, by the internet access client, of a client certificate associated with items of identification information of the internet access client and generated by a certificate server,
wherein the internet access client is executed on a computerized device;

a first authentication of the internet access client, said first authentication of the internet access client comprising
sending, by the internet access client, to said computer infrastructure, said client certificate associated with items of identification information of the internet access client;
receiving, by the internet access client, an authentication token generated by a token security module when the client certificate sent has been verified;

a second authentication of the user of the internet access client, said second authentication of the user of the internet access client comprising
sending, by the internet access client, to the computer infrastructure, data representing a security level of the second authentication of the user comprising the authentication token, user identification data and user authentication data, wherein said user identification data and said user authentication data are not included in the client certificate; and
receiving, by the internet access client, a permission for access to said remote resources of the computer infrastructure when the authentication token, the user identification data and the user authentication data have been verified;

wherein if the first authentication of the internet access client is unsuccessful, the user will be offered one or more methods of a third authentication of the user, having a higher security level than the security level of the second authentication.

2. The method for authenticating a user according to claim 1, wherein if the first authentication of the internet access client is unsuccessful, the method initiates said enrolling the internet access client.

3. The method for authenticating a user according to claim 1, further comprising, before the first authentication of the internet access client, establishing a secure channel between the internet access client and the computer infrastructure.

4. The method for authenticating a user according to claim 1, wherein if the first authentication of the internet access client is unsuccessful, the user will be refused said access to the remote resources of the computer infrastructure.

5. The method for authenticating a user according to claim 1, wherein the authentication token corresponds to a random code that can only be verified by the computer infrastructure.

6. The method for authenticating a user according to claim 1, further comprising, after receiving the permission of access, establishing, by the internet access client, a remote access session to the remote resources of the computer infrastructure.

7. The method for authenticating a user according to claim 1, wherein the computer infrastructure comprises at least one remote communications server that does not belong to a same local network as the internet access client.

8. The method for authenticating a user according to claim 1, further comprising verifying a match between the user identification data and the identification information of the internet access client utilized by the user, and when these data do not match, the permission for said access to the remote resources of the computer infrastructure is not granted.

9. A computer program product comprising a non-transitory storage medium that comprises program code instructions which, when executed on a computerized device, implement a method for authenticating a user utilizing an internet access client for accessing remote resources of a computer infrastructure when said computer program product is executed on said computerized device, wherein said method comprises:
  enrolling the internet access client, said enrolling comprising receiving, by the internet access client, of a client certificate associated with items of identification information of the internet access client and generated by a certificate server,
    wherein the internet access client is executed on said computerized device;
  a first authentication of the internet access client, said first authentication of the internet access client comprising
    sending, by the internet access client, to said computer infrastructure, said client certificate associated with items of identification information of the internet access client;
    receiving, by the internet access client, an authentication token generated by a token security module when the client certificate sent has been verified;
  a second authentication of the user of the internet access client, said second authentication of the user of the internet access client comprising
    sending, by the internet access client, to the computer infrastructure, data representing a security level of the second authentication of the user comprising the authentication token, user identification data and user authentication data, wherein said user identification data and said user authentication data are not included in the client certificate; and
    receiving, by the internet access client, a permission for access to said remote resources of the computer infrastructure when the authentication token, the user identification data and the user authentication data have been verified;
  wherein if the first authentication of the internet access client is unsuccessful, the user will be offered one or more methods of a third authentication of the user, having a higher security level than the security level of the second authentication.

10. A computerized device configured for authenticating a user for access to remote resources of a computer infrastructure, said computerized device comprising:
  a hardware processor; and
  an internet access client executed on said hardware processor configured to implement enrolling the internet access client, said enrolling comprising receiving, by the internet access client, of a client certificate associated with items of identification information of the internet access client and generated by a certificate server;
    a first authentication of the internet access client, said first authentication of the internet access client comprising
      sending, to said computer infrastructure, said client certificate associated with items of identification information of the internet access client;
      receiving, an authentication token generated by a token security module when the client certificate sent has been verified;
    a second authentication of the user of the internet access client, said second authentication of the user of the internet access client comprising
      sending, to the computer infrastructure, data representing a security level of the second authentication of the user comprising the authentication token, user identification data and user authentication data, wherein said user identification data and said user authentication data are not included in the client certificate;
      receiving, a permission for access to remote resources of the computer infrastructure when the authentication token, the user identification data and the user authentication data have been verified;
  wherein if the first authentication of the internet access client is unsuccessful, the user will be offered one or more methods of a third authentication of the user, having a higher security level than the security level of the second authentication.

* * * * *